United States Patent
Matsushita et al.

(10) Patent No.: US 6,545,795 B2
(45) Date of Patent: Apr. 8, 2003

(54) MAGNETO-OPTICAL MEMBER AND OPTICAL ISOLATOR USING THE SAME

(75) Inventors: Takeshi Matsushita, Iwata-gun (JP); Mitsuteru Inoue, Okazaki (JP); Hideki Kato, Iwata-gun (JP); Akio Takayama, Iwata-gun (JP)

(73) Assignee: Minebea Co., Ltd., Miyota-machi (JP)

( * ) Notice: Subject to any disclaimer, the term of this patent is extended or adjusted under 35 U.S.C. 154(b) by 79 days.

(21) Appl. No.: 09/948,688

(22) Filed: Sep. 10, 2001

(65) Prior Publication Data

US 2002/0063941 A1 May 30, 2002

(30) Foreign Application Priority Data

Sep. 11, 2000 (JP) ........................................ 2000-274936

(51) Int. Cl.⁷ .................................................. C02F 1/09
(52) U.S. Cl. ........................................ 359/280; 359/282
(58) Field of Search ................................ 359/280, 282, 359/281, 240, 239, 238

(56) References Cited

2002/0025450 A1 * 2/2002 Inoue et al. ................ 428/694
2002/0139974 A1 * 10/2002 Matsushita et al. ........... 257/39

FOREIGN PATENT DOCUMENTS

JP    A 11-283512    10/1999

* cited by examiner

*Primary Examiner*—Georgia Epps
*Assistant Examiner*—Timothy Thompson
(74) *Attorney, Agent, or Firm*—Oliff & Berridge, PLC

(57) ABSTRACT

The present invention provides a magneto-optical member capable of ensuring an excellent light transmittance and an optical isolator using the same. A first one-dimensional magnetic photonic crystal having a magneto-optical thin film, and a second one-dimensional magnetic photonic crystal having another magneto-optical thin film are laminated so as to sandwich a dielectric thin film with a small refractive index having an optical length of $\lambda/4+m\lambda/2$ where $\lambda$ is a wavelength of light and m is 0 or a positive integer. Since a plurality of magneto-optical thin films are present as magnetic thin films and hence the total thickness of the magnetic thin films is increased, the Faraday rotation angle is increased. Also, a large light transmittance can be obtained because of the presence of the dielectric thin film with a small refractive index having $(\lambda/4+m\lambda/2)$ thickness where the first and second one-dimensional magnetic photonic crystals are laminated.

7 Claims, 9 Drawing Sheets

Fig. 8
PRIOR ART
(I)
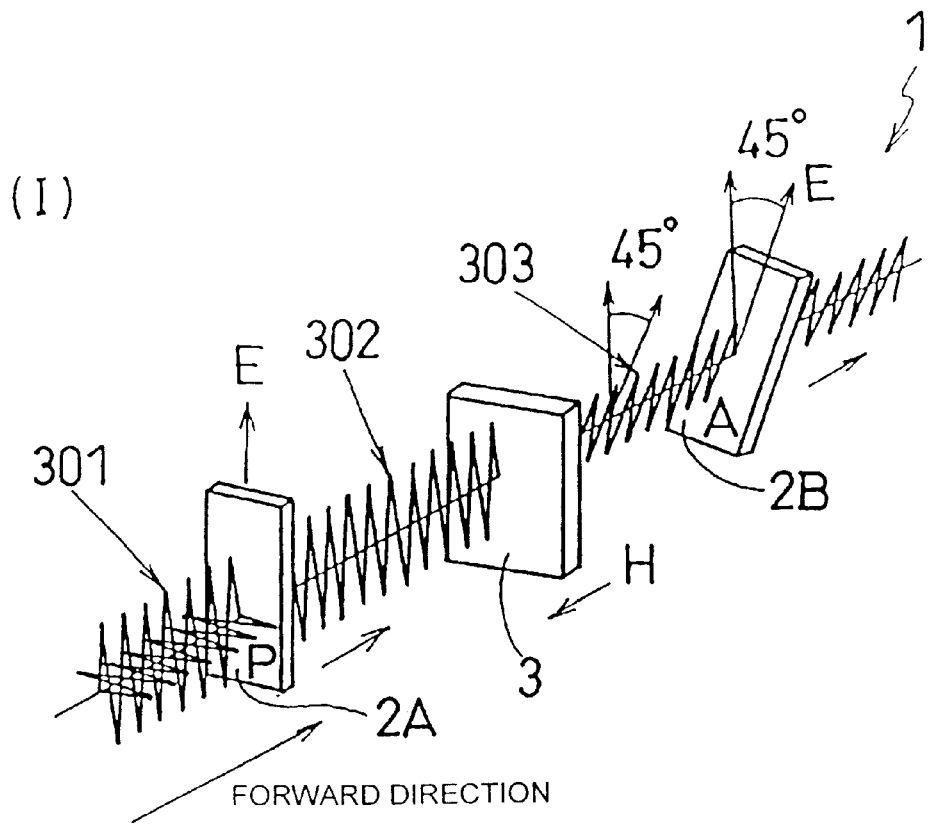
FORWARD DIRECTION
(II)
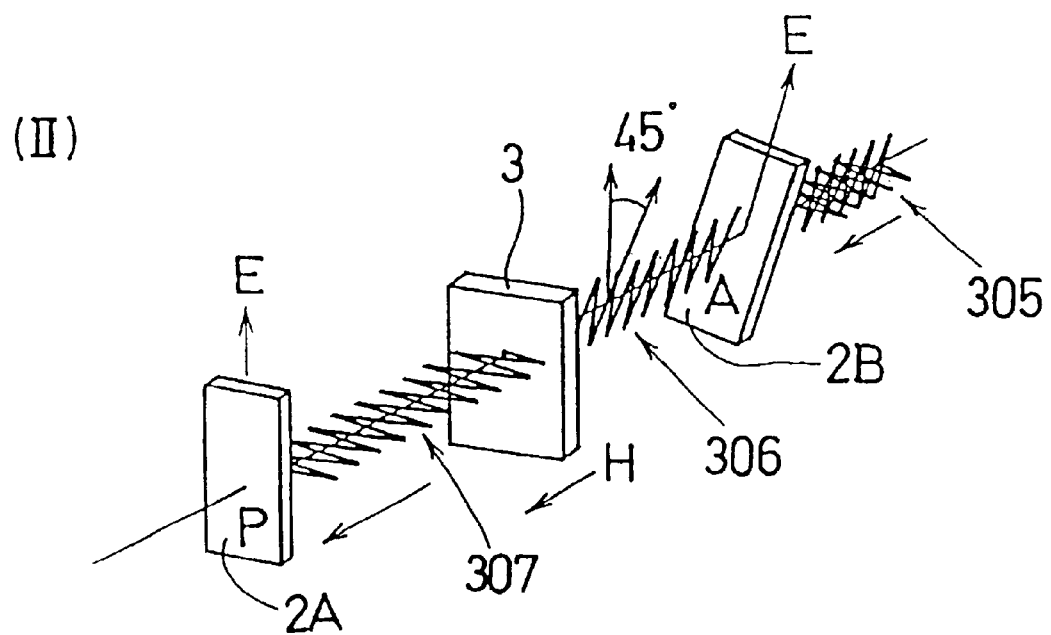

MAGNETO-OPTICAL MEMBER AND OPTICAL ISOLATOR USING THE SAME

BACKGROUND OF THE INVENTION

1. Field of the Invention

The present invention relates to a magneto-optical member which is used in a 45 degree Faraday rotator as one constituent member of an optical isolator for use in an optical fiber communication system, an optical measurement system and the like, and also to an optical isolator using the magneto-optical member. Now, the optical isolator includes a polarizer, an analyzer, a 45 degree Faraday rotator which is interposed between the polarizer and the analyzer and which has a magneto-optical effect such as the Faraday effect, and a magnet for applying magnetic field to the 45 degree Faraday rotator, and serves to propagate light emitted from a light source (semiconductor laser) to a transmission path such as an optical fiber or the like without any loss, and to block reflected light from the optical fiber or the like so as to prohibit the reflected light from returning to the light source (semiconductor laser).

2. Description of the Related Art

In an optical fiber communication system having a semiconductor laser as a light source, in particular, an optical system based on a high speed digital transmission or an analog direct modulation mode, if reflected light from optical connector connections, optical circuit components and the like which are used in an optical fiber circuit returns to the semiconductor laser or an optical amplifier, it becomes difficult to maintain high quality transmission due to degradation of frequency characteristics or generation of noises. An optical isolator is used for the purpose of removing the reflected light.

FIG. 7 shows the construction of an optical isolator, and FIG. 8 shows the principles of operation thereof.

In FIGS. 7 and 8, an optical isolator 1 is generally constituted by a polarizer 2A and an analyzer 2B which allow only the light component having a fixed plane of polarization to pass through, a 45 degree Faraday rotator 3 which is provided between the polarizer 2A and the analyzer 2B and rotates the plane of polarization of light by 45 degrees, and a permanent magnet 4 for applying a magnetic field H to the 45 degree Faraday rotator 3.

Light 301 which travels in the forward direction shown in a part (I) of FIG. 8 is not polarized, but after having passed through the polarizer 2A, becomes light 302 which has only a component oriented in the direction of the polarization of the polarizer 2A. Then, after having passed through the 45 degree Faraday rotator 3, the light 302 becomes light 303 in which the polarization direction is rotated by 45 degrees. If the polarization direction of the analyzer 2B is adjusted so as to run parallel to the polarization direction of the light which has been rotated by 45 degrees, the light passes through the analyzer 2B with a minimum loss.

On the other hand, as shown in a part (II) of FIG. 8, as for light 305 which has been reflected and propagates from the optical fiber or the like in the backward direction, only light 306 having a component oriented in the polarization direction of the analyzer 2B passes through the analyzer 2B to be made incident on the 45 degree Faraday rotator 3 in the backward direction. This light 306 is further rotated by 45 degrees in the same direction as when traveling in the forward direction on the basis of the non-reciprocity peculiar to the Faraday effect. As a result, after having passed through the 45 degree Faraday rotator 3, the light 306 becomes light 307 which has a polarization direction perpendicular to the polarization direction of the polarizer 2A and therefore is blocked at the polarizer 2A so as not to return to the light source.

Of the constituent members of the optical isolator 1, the 45 degree Faraday rotator 3 has a large influence on the performance of the optical isolator 1. The 45 degree Faraday rotator 3 is required to have a small element length necessary for rotating the plane of polarization by 45 degrees and a large light transmittance. Up to now, a magneto-optical member which is employed as the 45 degree Faraday rotator 3 may be made, for example, of a yttrium iron garnet (YIG) bulk single crystal (about 2 mm in thickness), or of a bismuth-substituted rare earth iron garnet (BiYIG) thick film single crystal in which a part of yttrium is substituted with bismuth having a large magneto-optical performance index (several hundred $\mu$m in thickness). Recently, the BiYIG thick film single crystal is employed as the magneto-optical member in many cases because it is advantageous in the miniaturization of the optical isolator.

This BiYIG thick film single crystal is produced by utilizing a liquid phase epitaxial (LPE) growth method. In order to carry out a stable liquid phase epitaxial growth, many production parameters need to be accurately controlled, and therefore it is difficult to grow uniform single crystals over a large area with a high yield. In addition, the fact that it takes 20 hours or more to grow the single crystals and that an expensive non-magnetic GGG (gadolinium gallium garnet) single crystalline wafer needs to be employed for the substrate is an obstacle to the reduction in cost.

Under the situation described above, in order to solve the above-mentioned problems associated with the magneto-optical member which is produced by utilizing the liquid phase epitaxial growth method, the present inventors disclosed in Japanese Patent Application No. Hei 11-283512 the magneto-optical member (45 degree Faraday rotator) made of one-dimensional magnetic photonic crystal which causes the enhancement of the magneto-optical effect (the Faraday effect is one kind of magneto-optical effect) due to the localization of light. Then, though the above-mentioned magneto-optical member made of the one-dimensional magnetic photonic crystal is of polycrystals with a thickness of several $\mu$m, a large Faraday rotation angle can be obtained.

In this connection, the one-dimensional magnetic photonic crystal is also described in JOURNAL OF THE MAGNETICS SOCIETY OF JAPAN, Vol. 23, pp. 1861 to 1866 (1999). The one-dimensional magnetic photonic crystal is structured such that a layer of magnetic substance and a layer of dielectric substance are alternately and multiply laminated with each thickness thereof irregular and formed into a thin film, or that two dielectric films, which are each formed of multiple layers having two kinds of dielectric substances different from each other and alternately laminated with each thickness thereof regular, sandwich a layer of magnetic substance having a thickness different from the layers of dielectric substance.

Of the above-mentioned structures, the latter is identical to the structure known long as the Fabry-Perot resonator structure and is found to be easily manufactured and at the same time to have a large enhancement as well. A magneto-optical member 10 made of one-dimensional magnetic photonic crystal is shown in FIG. 9 as an example.

The magneto-optical member 10 made of one-dimensional magnetic photonic crystal includes two periodic dielectric multilayer films 13 and 14 in each of which two kinds of dielectric substances (dielectric thin films) 11 and 12 are alternately laminated with each thickness thereof regular, and a magnet-optical thin film (made of magnetic substance) 15 which is provided between the two periodic dielectric multilayer films 13 and 14.

The periodic dielectric multilayer films 13 and 14 play a part of the reflecting mirror of the Fabry-Perot resonator. While a ($Ta_2O_5/SiO_2$) system multilayer film is generally employed as the periodic dielectric multilayer films 13 and 14, a ($Si/SiO_2$) system multilayer film has also been proposed in which a large Faraday rotation angle can be obtained with a smaller number of laminations than in the ($Ta_2O_5/SiO_2$) system multilayer film. The thickness of each of the dielectric substances (dielectric thin films) 11 and 12 needs to be designed in such a way that its optical length (actual thickness×refractive index) is equal to $\lambda/4$ ($\lambda$ is the wavelength of light). In addition, it is general that the optical length of the magneto-optical thin film 15 in which the localization of light occurs is set equal to $m\lambda/2$ (m is a positive integer).

Now, FIG. 10 shows the dependency of the light transmittance and the Faraday rotation angle on the number of laminations in one-dimensional magnetic photonic crystal (the magneto-optical member 10) of $(Ta_2O_5/SiO_2)^n/BiYIG/(SiO_2/Ta_2O_5)^n$ structure (the number n of laminations=6, 7 and 8) as one example of the ($Ta_2O_5/SiO_2$) system. FIG. 11 shows the dependency of the light transmittance and the Faraday rotation angle on the number of laminations in one-dimensional magnetic photonic crystal (the magneto-optical member 10) of $(Si/SiO_2)^n/BiYIG/(SiO_2/Si)^n$ structure (the number n of laminations=3, 4 and 5) as one example of the ($Si/SiO_2$) system. The wavelength of light is 1.3 μm and the optical length of the magneto-optical thin film (magnetic substance) 15 is $\lambda/2$.

As apparent from FIGS. 10 and 11, both in the ($Ta_2O_5/SiO_2$) system multilayer and the ($Si/SiO_2$) system multilayer film, the Faraday rotation angle increases in proportion to the increase in the number n of laminations and the light transmittance decreases largely with the increase in the Faraday rotation angle. The decrease of the light transmittance means that the transmittable distance of laser beam which propagates through the optical fiber is shortened. This constitutes a serious obstacle to the construction of the system.

SUMMARY OF THE INVENTION

The present invention has been made in the light of the foregoing, and it is therefore an object of the present invention to provide a magneto-optical member capable of ensuring an excellent light transmittance, and an optical isolator using the same.

According to a first aspect of the present invention, there is provided a magneto-optical member in which a plurality of one-dimensional magnetic photonic crystals, each having two dielectric multilayer films in each of which two kinds of dielectric thin films having optical characteristics different from each other are alternately laminated with each thickness thereof regular and a magnetic thin film which is provided between the two dielectric multilayer films, are laminated with two adjacent ones sandwiching a dielectric thin film having an optical length predetermined as $\lambda/4+m\lambda/2$ where $\lambda$ is a wavelength of light and m is 0 or a positive integer.

According to a second aspect of the present invention, in the first aspect of the present invention, an optical length of each of the two kinds of dielectric thin films is set to $\lambda/4$.

According to a third aspect of the present invention, in the first or second aspect of the present invention, the two kinds of dielectric thin films have different refractive indexes from each other, and one dielectric thin film thereof having a smaller refractive index is in contact with the magnetic thin film.

According to a fourth aspect of the present invention, in any one of the first to third aspects of the present invention, an optical length of the magnetic thin film is set to an integral multiple of $\lambda/2$.

According to a fifth aspect of the present invention, in any one of the first to third aspects of the present invention, two of the one-dimensional magnetic photonic crystals are provided, and the magnetic thin films thereof have respective optical lengths which are integral multiples of $\lambda/2$ and different from each other.

According to a sixth aspect of the present invention, in any one of the first to fifth aspects of the present invention, the two kinds of dielectric thin films have different refractive indexes from each other, and the dielectric thin film having a predetermined optical length is made of a substance identical to that of the one dielectric thin film having a smaller refractive index out of the two kinds of dielectric thin films.

According to a seventh aspect of the present invention, there is provided an optical isolator in which the magneto-optical member defined in any one of the first to sixth aspects of the present invention is employed as a 45 degree Faraday rotator.

BRIEF DESCRIPTION OF THE DRAWINGS

The above and other objects as well as advantages of the present invention will become clear by the following description of the preferred embodiments of the present invention with reference to the accompanying drawings, wherein:

FIGS. 8I and II are schematic views explaining the principles of operation of the conventional optical isolator;

DETAILED DESCRIPTION OF THE PREFERRED EMBODIMENTS

Preferred embodiments of the present invention will hereinafter be described in detail with reference to the accompanying drawings.

First of all, a magneto-optical member 10A according to a first embodiment of the present invention will hereinbelow be described with reference to FIGS. 1 to 3.

Figure 1:
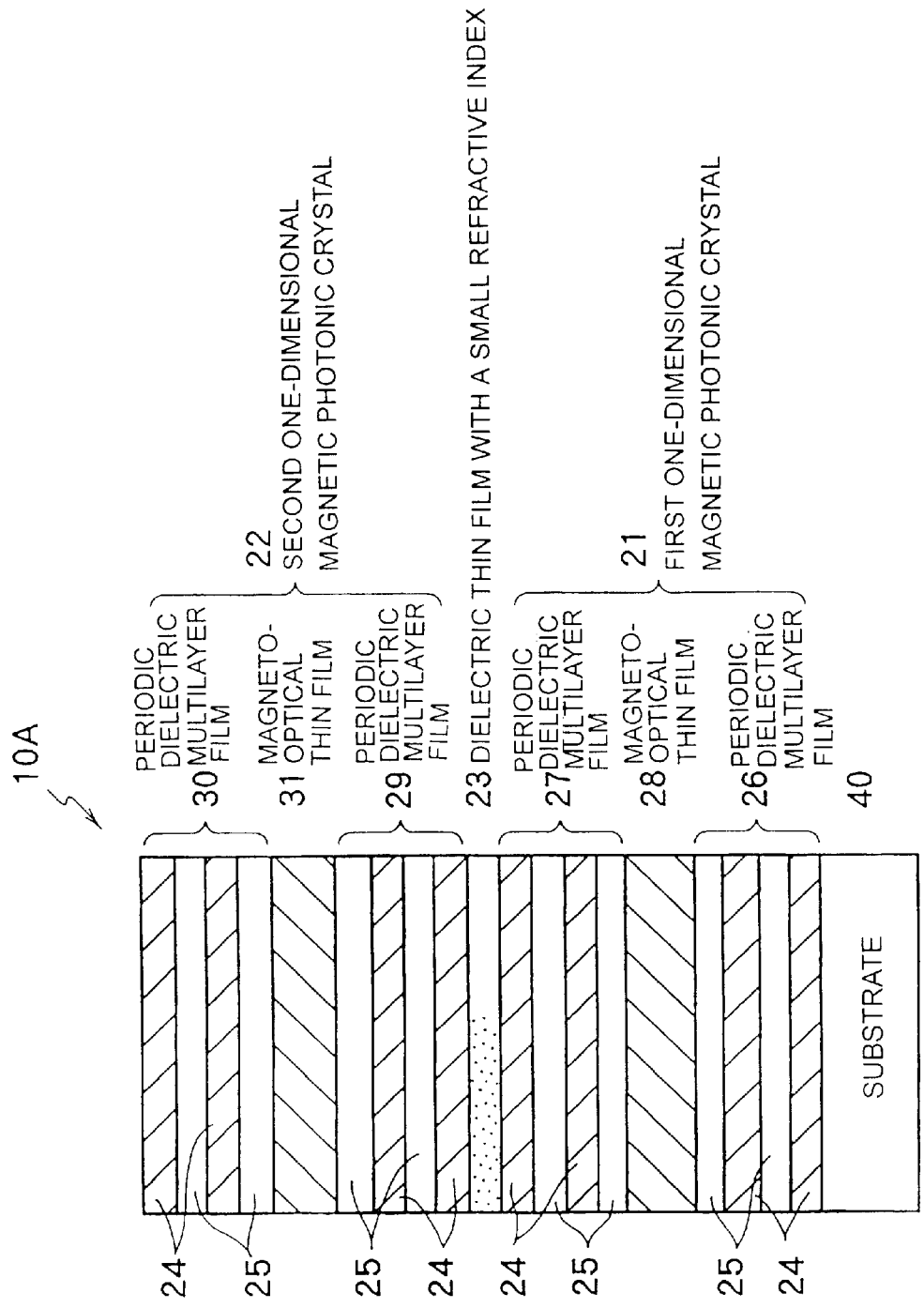
FIG. 1 is a cross sectional view showing schematically a magneto-optical member according to a first embodiment of the present invention.

As shown in FIG. 1, the magneto-optical member 10A has two one-dimensional magnetic photonic crystals 21 and 22 which are laminated so as to sandwich a dielectric thin film with a small refractive index (a dielectric thin film having a predetermined optical length) 23 which has an optical length of $\lambda/4$ ($\lambda$ is the wavelength of light). The dielectric thin film with a small refractive index 23 is a $SiO_2$ film (refractive index is 1.415).

Hereinafter, for the sake of convenience, of the two one-dimensional magnetic photonic crystals 21 and 22, the lower in FIG. 1 is referred to as a first one-dimensional magnetic photonic crystal 21, while the upper is referred to as a second one-dimensional magnetic crystal 22.

The first one-dimensional magnetic photonic crystal 21 includes two periodic dielectric multilayer films (dielectric multilayer films) 26 and 27 in each of which two kinds of dielectric thin films having different optical characteristics from each other (hereinafter referred to as "a first dielectric thin film 24 and a second dielectric thin film 25") are alternately laminated with each thickness thereof regular, and a magneto-optical thin film 28 [a magnetic thin film, a bismuth-substituted rare earth iron garnet (BiYIG) film (refractive index is 2.36)] which is provided between the two periodic dielectric multilayer films 26 and 27.

Likewise, the second one-dimensional magnetic photonic crystal 22 includes two periodic dielectric multilayer films (dielectric multilayer films) 29 and 30 in each of which two kinds of dielectric thin films having different optical characteristics from each other (a first dielectric thin film 24 and a second dielectric thin film 25) are alternately laminated with each thickness thereof regular, and a magneto-optical thin film 31 [a magnetic thin film, a bismuth-substituted rare earth iron garnet (BIYIG) film (refractive index is 2.36)] which is provided between the two periodic dielectric multilayer films 29 and 30. In the present embodiment, the first dielectric film 24 is made of a $Ta_2O_5$ film (refractive index is 2.14), and the second dielectric film 25 is made of a $SiO_2$ film (refractive index is 1.415).

The optical length of each of the magneto-optical thin films 28 and 31 is set to $\lambda/2$.

More specifically, the film structure of the magneto-optical member 10A is $(Ta_2O_5/SiO_2)^n/BiYIG/(SiO_2/Ta_2O_5)^n/(SiO_2)/(Ta_2O_5/SiO_2)^n/BiYIG/(SiO_2/Ta_2O_5)^n$ (the number n of laminations=6, 7 or 8).

The first and second one-dimensional magnetic photonic crystals 21 and 22 form the Fabry-Perot resonator structure each having the $(Ta_2O_5/SiO_2)^n/BiYIG/(SiO_2/Ta_2O_5)^n$ structure [called the S.H.W (Single Half Wave) structure]. Then, the magneto-optical member 10A is structured such that the first and second one-dimensional magnetic photonic crystals 21 and 22 are laminated so as to sandwich the dielectric thin film with a small refractive index 23 ($SiO_2$ film) [hereinafter referred to as "the D.H.W (Double Half Wave) structure].

Of the two periodic dielectric multilayer films 26 and 27 of the first onedimensional magnetic photonic crystal 21, the lower in FIG. 1 is referred to as a first lower periodic dielectric multilayer film 26 [$(Ta_2O_5/SiO_2)^n$ film], while the upper is referred to as a first upper periodic dielectric multilayer film 27 [$(SiO_2/Ta_2O_5)^n$ film].

In addition, of the two periodic dielectric multilayer films 29 and 30 of the second one-dimensional magnetic photonic crystal 22, the lower in FIG. 1 is referred to as a second lower periodic dielectric multilayer film 29 [$(Ta_2O_5/SiO_2)^n$ film], while the upper is referred to as a second upper periodic dielectric multilayer film 30 [$(SiO_2/Ta_2O_5)^n$ film].

In the present embodiment, the thickness (optical length) of the first dielectric thin film ($Ta_2O_5$ thin film) 24 and the second dielectric thin film ($SiO_2$ thin film) 25 of the first lower periodic dielectric multilayer film 26 is set to 4, the thickness (optical length) of the first dielectric thin film ($Ta_2O_5$ thin film) 24 and the second dielectric thin film ($SiO_2$ thin film) 25 of the first upper periodic dielectric multilayer film 27 is set to $\lambda/4$, the thickness (optical length) of the first dielectric thin film ($Ta_2O_5$ thin film) 24 and the second dielectric thin film ($SiO_2$ thin film) 25 of the second lower periodic dielectric multilayer film 29 is set to $\lambda/4$, and the thickness (optical length) of the first dielectric thin film ($Ta_2O_5$ thin film) 24 and the second dielectric thin film ($SiO_2$ thin film) 25 of the second upper periodic dielectric multilayer film 30 is set to $\lambda/4$. In such a way, the thickness (optical length) of each of the first dielectric thin films 24 and the second dielectric thin films 25 is set to $\lambda/4$, whereby a large Faraday rotation angle can be obtained.

In addition, in the first one-dimensional magnetic photonic crystal 21, the first lower periodic dielectric multilayer film 26 is in contact with the magneto-optical thin film 28, specifically the second dielectric thin film ($SiO_2$ thin film) 25 having a smaller refractive index out of the two kinds of dielectric thin film 24 and 25 constituting the first lower periodic dielectric multilayer film 26 is in contact with the magneto-optical thin film 28. Also, in the first upper periodic dielectric multilayer film 27, the second dielectric thin film ($SiO_2$ thin film) 25 having a smaller refractive index is in contact with the magneto-optical thin film 28.

In addition, likewise, with respect to the second lower periodic dielectric multilayer film 29 and the second upper periodic dielectric multilayer film 30, the second dielectric thin film ($SiO_2$ thin film) 25 having a smaller refractive index is in contact with the magneto-optical thin film 31.

Figure 2:
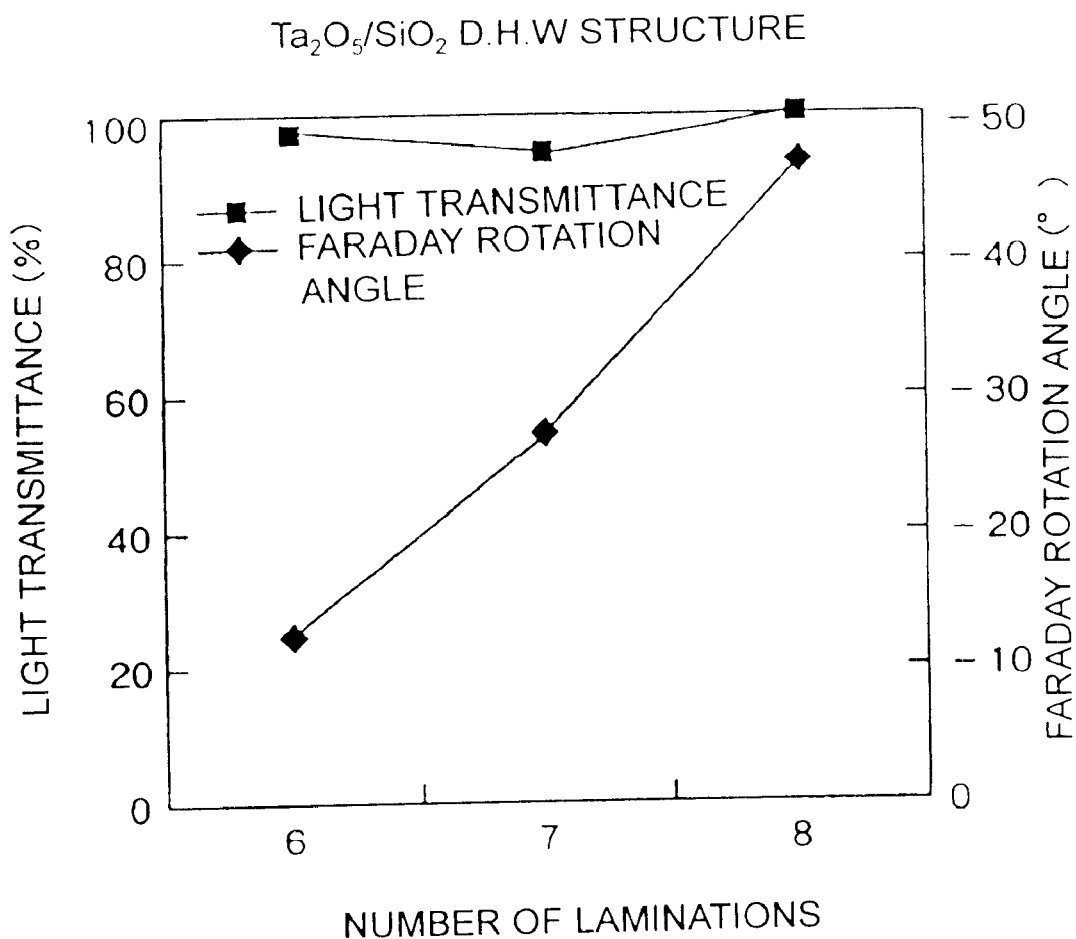
FIG. 2 is a graphical representation explaining the light transmittance and the Faraday rotation angle in the magneto-optical member shown in FIG. 1.

The dependency of the light transmittance and the Faraday rotation angle on the number of laminations in the magneto-optical member 10A having the D.H.W structure thus constructed was examined and the results shown in FIG. 2 were obtained.

Figure 10:
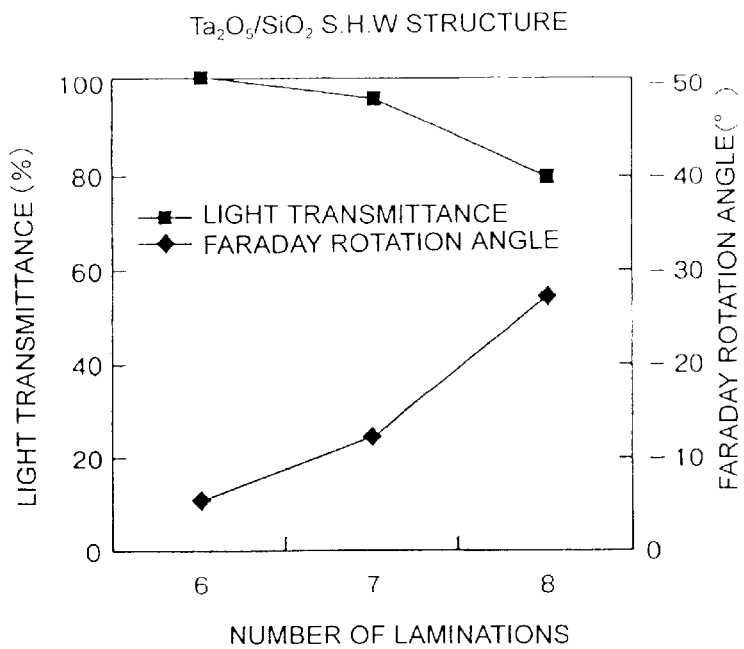
FIG. 10 is a graphical representation explaining the light transmittance and the Faraday rotation angle in an example of a conventional ($Ta_2O_5/SiO_2$) system magneto-optical member.

Then, the Faraday rotation angle of the magneto-optical member 10A shown in FIG. 2 was compared with the Faraday rotation angle of the magneto-optical member having the S.H.W structure shown in FIG. 10, and it is understood that the Faraday rotation angle improved at all of the number of laminations (the number n of laminations=6, 7 and 8). The reason of the improvement in the Faraday rotation angle resides in that the magneto-optical thin film (BiYIG film) 28 is present twice as many, whereby the total thickness thereof is doubled.

As described above, in the present embodiment in which the first one-dimensional magnetic photonic crystal 21 and the second one-dimensional magnetic photonic crystal 22 are laminated so as to sandwich the dielectric thin film with small refractive index 23 (the dielectric thin film having a predetermined optical length) having an optical length of $\lambda/4$ ($\lambda$ is the wavelength of light), a large Faraday rotation angle can be obtained without reducing the light transmittance as shown in FIG. 2.

Now, it should be noted that with 8 laminations (n=8), the light transmittance, which was 80% in the magneto-optical member with the S.H.W structure, improved approximately up to 100% with the D.H.W structure. Essentially, when two Fabry-Perot resonators are discretely connected to each other, the light transmittance is $T^2$, where T is the light transmittance of each of the two Fabry-Perot resonators (T<1).

Because T is smaller than 1, when two Fabry-Perot resonators are subjected to the cascade connection, the light transmittance thereof ought to decrease as compared with the case of one Fabry-Perot resonator. On the contrary, the light transmittance increased. While the mechanism of this unique phenomenon is not yet sufficiently made clear, it is supposed that the presence of the $SiO_2$ film having a thickness of $\lambda/4$ (the dielectric thin film having a predetermined optical length, the dielectric thin film with a small refractive index 23) which connects the two Fabry-Perot resonators has a large influence on the light transmittance. Also when the optical length of the dielectric thin film with a predetermined optical length was set to $3\lambda/4$ (=$\lambda/4+\lambda/2$), the same effect could be gained.

While the optical length of the magneto-optical thin films 28 and 31 is set to $\lambda/2$ in the present embodiment, it may also be set to an integral multiple (other than 1) of $\lambda/2$. Thus, the optical length of the magneto-optical thin films 28 and 31 is set to an integral multiple of $\lambda/2$ including $\lambda/2$ in the present embodiment, whereby light can be localized.

In the present embodiment, as described above, the thickness (optical length) of the first dielectric thin film ($Ta_2O_5$ thin film) 24 and the second dielectric thin film ($SiO_2$ thin film) 25 of each of the first lower periodic dielectric multilayer film 26, the first upper periodic dielectric multilayer film 27, the second lower periodic dielectric multilayer film 29 and the second upper periodic dielectric multilayer film 30 is set to $\lambda/4$. With this structure, the magneto-optical member can be easily manufactured, thereby enhancing the productivity.

Next, the method of manufacturing the above-mentioned magneto-optical member 10A will hereinbelow be described with reference to FIG. 3.

The first dielectric thin film ($Ta_2O_5$ thin film) 24 with $\lambda/4$ thickness which has a larger refractive index is formed on a substrate 40 having an excellent light-permeability and subjected to optical polishing (Step S1), and the second dielectric thin film ($SiO_2$ thin film) 25 with $\lambda/4$ thickness which has a smaller refractive index is formed thereon (Step S2). This process (Step S1 and Step S2) is repeated n times to obtain the first lower periodic dielectric multilayer film [$(Ta_2O_5/SiO_2)^n$ film] 26. To form these films, thin film manufacturing techniques such as sputtering, vapor-deposition, CVD (Chemical Vapor Deposition Method) or the like can be applied. When forming the films, the process needs to be sufficiently controlled so that the optical length of each of the films is accurately set to $\lambda/4$.

Next, the BiYIG film (the magneto-optical thin film 28) with a predetermined thickness (in which the optical length is $\lambda/2$) is formed on the first lower periodic dielectric multilayer film [$(Ta_2O_5/SiO_2)$ multilayer film] 26 (Step S3).

The BiYIG film (the magneto-optical thin film 28) needs to be subjected to heat treatment at a high temperature to be crystallized because it is amorphous immediately after the deposition and hence does not have magnetism. For this reason, following Step S3, the BiYIG film (the magneto-optical thin film 28) is subjected to the heat treatment at a high temperature to be crystallized (Step S4). The heat treatment may be carried out in a normal electric furnace depending on the combination of the two kinds of dielectric substances [($Ta_2O_5$ thin film) and ($SiO_2$ thin film)] and the heat treatment temperature. On the other hand, when the turbulence of the periodic structure of the multilayer film gives a problem, an infrared beam heating system which was devised by the present inventors (refer to Japanese Patent Application No. Hei 11-283512) may be employed.

Next, the first upper periodic dielectric multilayer film [$(SiO_2/Ta_2O_5)^n$ multilayer film] 27 which has a predetermined number of laminations and which constitutes another reflecting mirror is formed on the magneto-optical thin film 28 and forms, together with the first lower periodic dielectric multilayer film [$(Ta_2O_5/SiO_2)^n$ multilayer film] 26 and the magneto-optical thin film 28 which are formed toward the substrate 40, the first one-dimensional magnetic photonic crystal 21 (Step S5 and Step S6). In Step S5 and Step S6, as shown in FIG. 1, the two kinds of dielectric thin films are alternately laminated on the magneto-optical thin film 28 in the order of the $SiO_2$ film (the second dielectric thin film 25) and the $Ta_2O_5$ film (the first dielectric thin film 24).

Next to Step S6, dielectric thin film ($SiO_2$ film) with a smaller refractive index 23 is formed in such a way that its optical length is set to $\lambda/4$ (step S7). In this case, the dielectric thin film with a small refractive index 23 is formed of a film whose refractive index is smaller than that of the first dielectric thin film ($Ta_2O_5$ film) 24 constituting a final layer of the first upper periodic dielectric multilayer film [$(SiO_2/Ta_2O_5)$ multilayer film] 27, i.e., the $SiO_2$ film (the second dielectric thin film 25). In the present embodiment, the material of the dielectric thin film with a small refractive index 23 is identical to that of the $SiO_2$ film (the second dielectric thin film 25) having a smaller refractive index out of the two kinds of dielectric thin films 24 and 25 which constitute the periodic dielectric multilayer film, and hence the work efficiency can be improved. Both materials need not be identical to each other as in the present embodiment.

Subsequently, in accordance with the procedure described above, the formation of the second lower periodic dielectric multilayer film [$(Ta_2O_5/SiO_2)^n$ multilayer film] 29, the formation of the magneto-optical thin film 31 having the Faraday effect, the heat treatment for the magneto-optical thin film 31, and the formation of the second upper periodic dielectric multilayer film [$(SiO_2/Ta_2O_5)^n$ multilayer film] 30 are repeatedly carried out in this order to obtain the second one-dimensional magnetic photonic crystal 22, thereby completing the one-dimensional magnetic photonic crystal which has the D.H.W structure to include the first one-dimensional magnetic photonic crystal 21 and the dielectric thin film with a small refractive index 23.

In this case, in order to laminate the multilayer films constituting the Fabry-Perot resonator structure, the second one-dimensional magnetic photonic crystal 22 is laminated on the first one-dimensional magnetic photonic crystal 21 so as to sandwich the dielectric thin film with a small refractive index 23 having $\lambda/4$ optical length as described above.

After having produced the one-dimensional magnetic photonic crystal having the D.H.W structure as described above, as may be necessary, the nonreflective coating is applied to the side (the lower side in FIG. 1) of the substrate 40, on which no multilayer film is formed, and the resultant one-dimensional magnetic photonic crystal is processed so as to have a predetermined size using a dicing machine or the like to complete the magneto-optical member (45 degree Faraday rotator) 10A.

Figure 4:
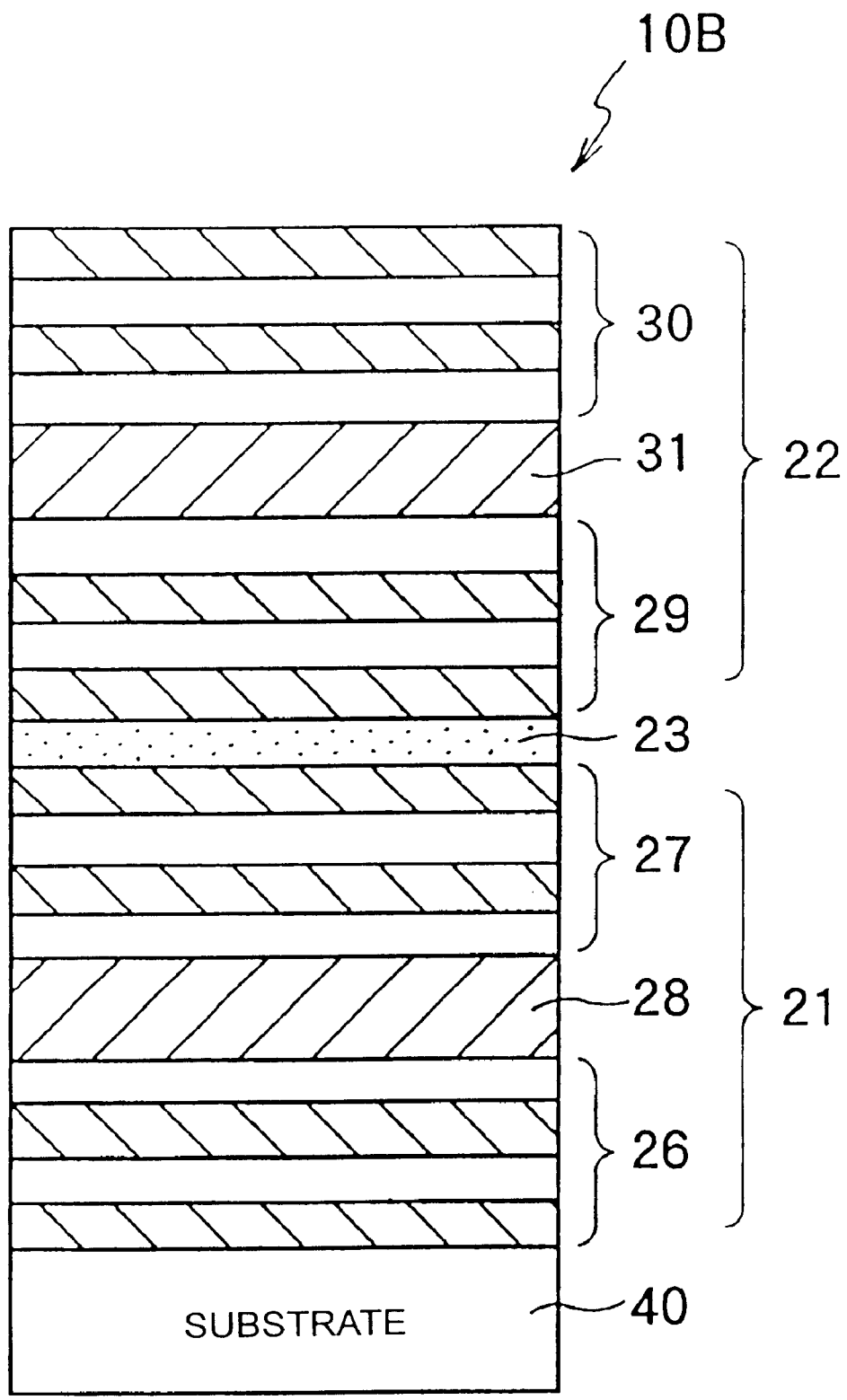
FIG. 4 is a cross sectional view showing schematically a magneto-optical member according to a second embodiment of the present invention.

Next, a magneto-optical member 10B according to a second embodiment of the present invention will hereinbelow be described based on FIGS. 4 and 5 and with reference to FIG. 1.

This magneto-optical member 10B has a $(Si/SiO_2)^n/BiYIG/(SiO_2/Si)^n/(SiO_2)/(Si/SiO_2)^n/BiYIG/(SiO_2/Si)^n$ structure (the number n of laminations=3, 4 or 5). Two periodic dielectric multilayer films $[(Si/SiO_2)^n/BiYIG/(SiO_2/Si)^n]$ constituting the Fabry-Perot resonator structure are laminated so as to sandwich a $SiO_2$ film with $\lambda/4$ optical length (dielectric thin film with a predetermined optical length) to obtain the D.H.W structure.

That is, in the magneto-optical member 10B according to the second embodiment, the first one-dimensional magnetic photonic crystal 21 has a $(Si/SiO_2)^n/BiYIG/(SiO_2/Si)^n$ structure, while the second one-dimensional magnetic photonic crystal 22 has a $(Si/SiO_2)^n/BiYIG/(SiO_2/Si)^n$ structure.

The first lower periodic dielectric multilayer film 26 is formed of a $(Si/SiO_2)^n$ film, and the first upper periodic dielectric multilayer film 27 is formed of a $(SiO_2/Si)^n$ film, while the second lower periodic dielectric multilayer film 29 is formed of a $(Si/SiO_2)^n$ film, and the second upper periodic dielectric multilayer film 30 is formed of a $(SiO_2/Si)^n$ film.

The $SiO_2$ film and the Si film constituting the periodic dielectric multilayer film have a refractive index of 1.415 and 3.11, respectively.

The magneto-optical thin film 28 is formed of a bismuth substituted rare earth iron garnet BiYIG film (its refractive index is 2.36), and has an optical length of $\lambda/2$.

Figure 5:
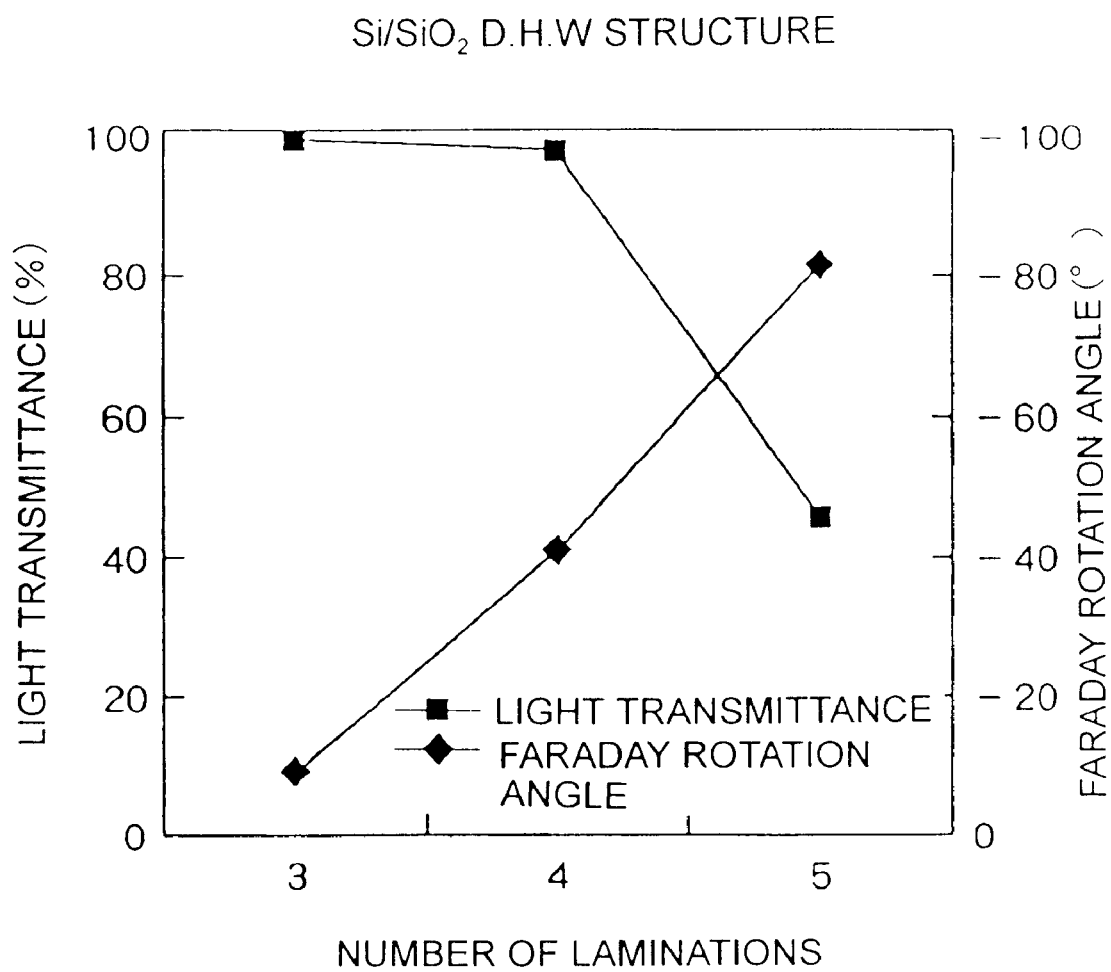
FIG. 5 is a graphical representation explaining the light transmittance and the Faraday rotation angle in the magneto-optical member shown in FIG. 4.

The dependency of the light transmittance and the Faraday rotation angle on the number of laminations in the magneto-optical member 10B having the D.H.W structure thus constructed was examined and the results shown in FIG. 5 were obtained.

Figure 11:
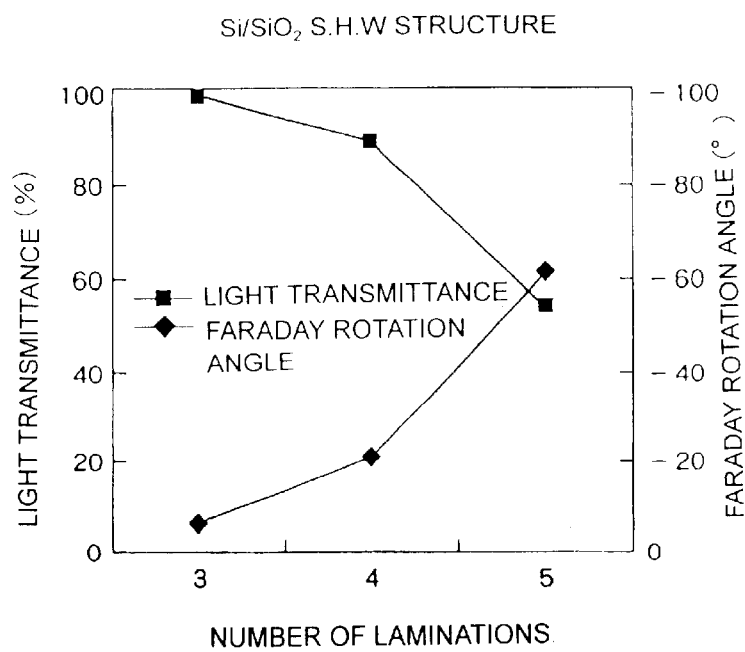
FIG. 11 is a graphical representation explaining the light transmittance and the Faraday rotation angle in another example of a conventional ($Si/SiO_2$) system magneto-optical member.

Then, the light transmittance and the Faraday rotation angle of the magneto-optical member 10B were compared with those of the magneto-optical member having the S.H.W structure shown in FIG. 11, and it was found that in the case of the number of laminations=4, the light transmittance and the Faraday rotation angle both improved.

For the magneto-optical member 10B according to the second embodiment, the optical thickness of one magneto-optical thin film 28 (for example, the magneto-optical thin film 28 of the first one-dimensional magnetic photonic crystal 21, the BiYIG thin film) of the two magneto-optical thin films 28 and 31 was set to $\lambda/2$, and the optical thickness of the other magneto-optical thin film 31 (the magneto-optical thin film 31 of the second one-dimensional magnetic photonic crystal 22, the BiYIG thin film) was set to $\lambda$ in order to further examine the optical characteristics. As a result, the Faraday rotation angle was found to increase by 30% while maintaining the light transmittance at 90% or more. In such a way, it was confirmed that by setting the optical thickness of the magneto-optical thin film 28 of the first one-dimensional magnetic photonic crystal different from that of the magneto-optical thin film 31 of the second one-dimensional magnetic photonic crystal 22, the Faraday rotation angle can be enhanced while maintaining the light transmittance at a large value.

Figure 3:
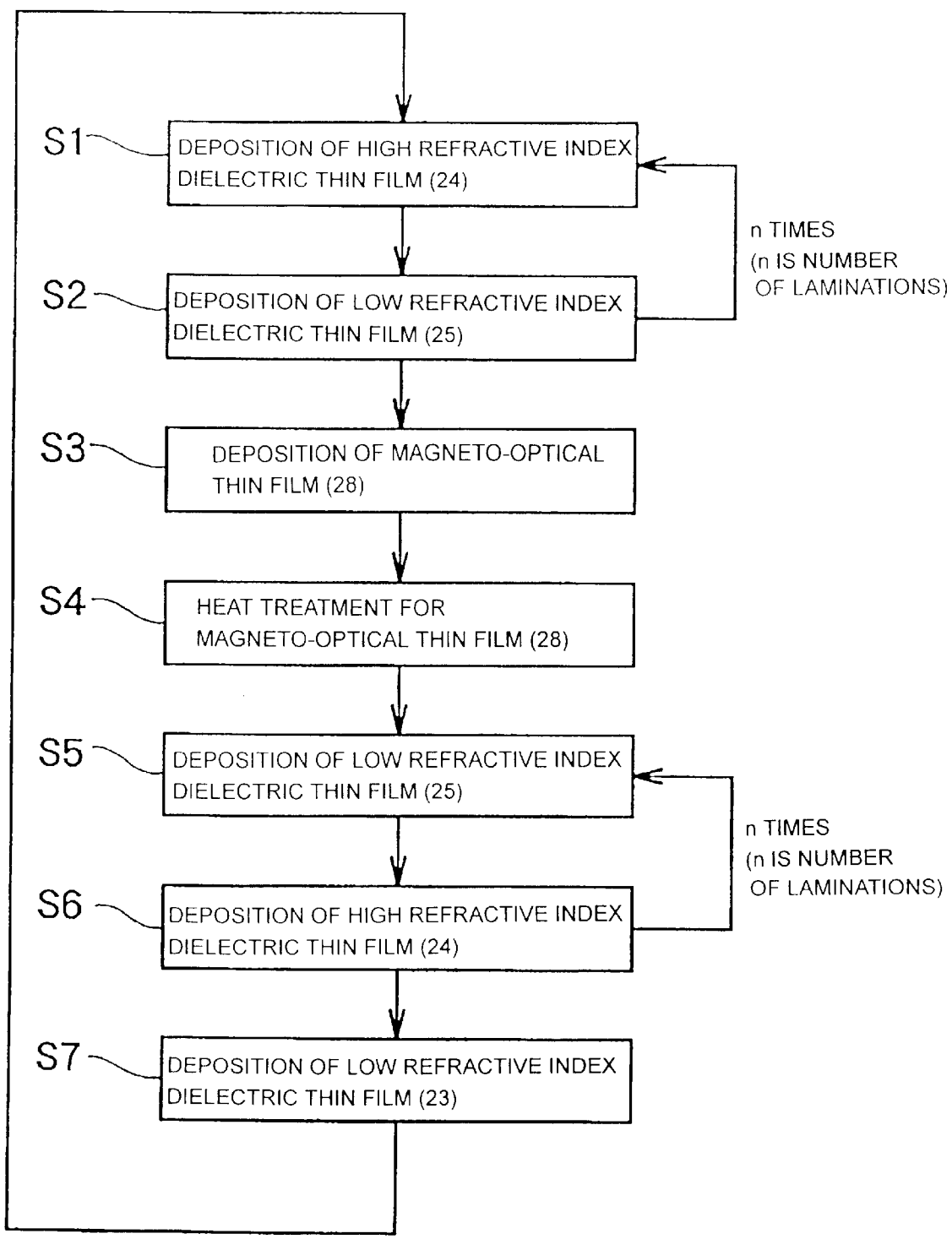
FIG. 3 is a flow chart explaining a method of manufacturing the magneto-optical member shown in FIG. 1.

In this connection, the magneto-optical member 10B of the second embodiment is also manufactured as shown in FIG. 3 in a similar manner to the magneto-optical member 10A of the above-mentioned first embodiment.

Figure 6:
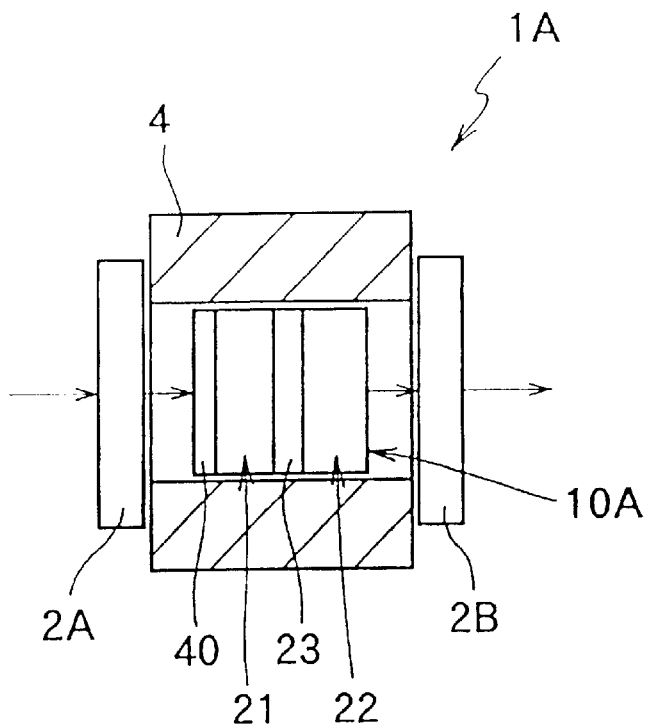
FIG. 6 is a cross sectional view showing schematically an optical isolator according to a third embodiment of the present invention.
Figure 7:
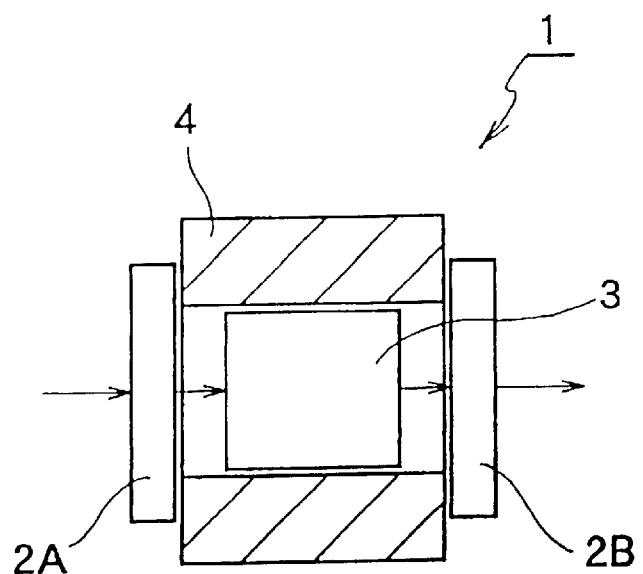
FIG. 7 is a cross sectional view showing one example of a conventional optical isolator.
Figure 9:
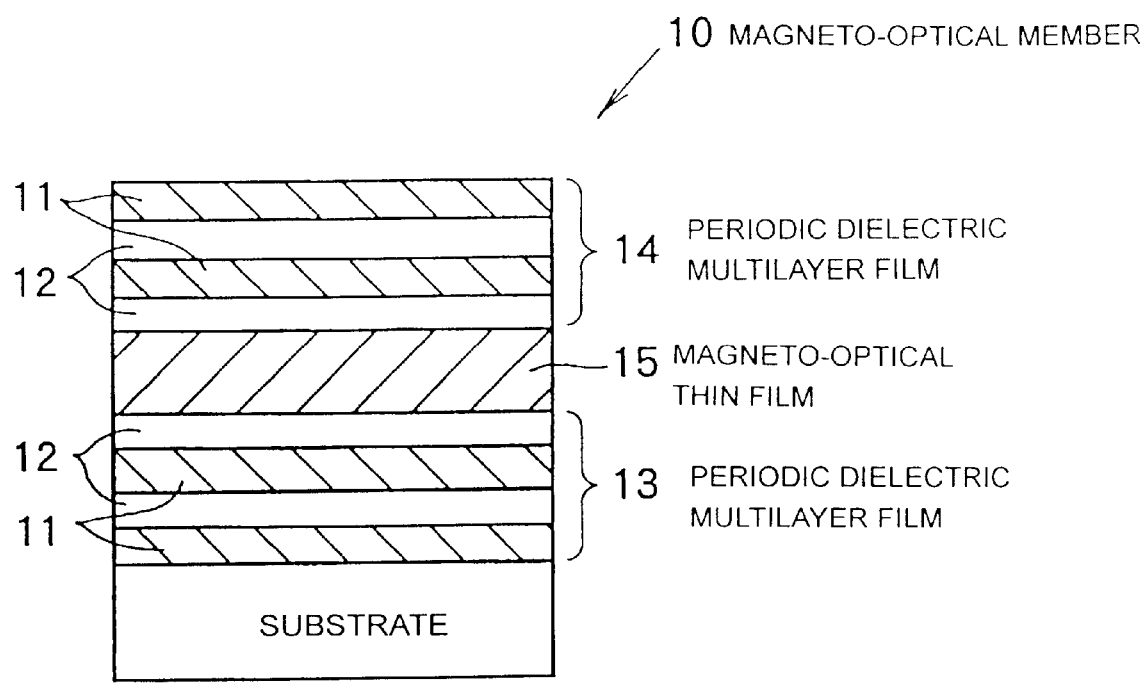
FIG. 9 is a cross sectional view showing schematically the structure of a conventional magneto-optical member.

In addition, as shown in FIG. 6, an optical isolator 1A (third embodiment) can be constructed by employing the magneto-optical member 10A according to the first embodiment.

The optical isolator 1A shown in FIG. 6 is generally constituted by a polarizer 2A and an analyzer 2B through each of which only light component having a fixed plane of polarization can pass, the magneto-optical member (45 degree Faraday rotator) 10A which is provided between the polarizer 2A and the analyzer 2B and which rotates the plane of polarization of light by 45 degrees, and a permanent magnet 4 for applying a magnetic field H to the magneto-optical member 10A, and serves to make it happen that light emitted from a light source (semiconductor laser) is propagated through a transmission line such as optical fibers without any loss, while any of reflected light from the optical fibers or the like is blocked so as not to return to the light source (semiconductor laser).

In this third embodiment, the magneto-optical member 10A according to the above-mentioned first embodiment is employed as the 45 degree Faraday rotator which is generally used in the optical isolator 1A.

Since in the optical isolator 1A of the third embodiment, as described above, the magneto-optical member 10A which has an excellent light transmittance and Faraday effect is employed as the 45 degree Faraday rotator, the characteristics such as the blocking of the reflected light from a transmission line and the like can be improved.

As set forth hereinabove, according to any one of the first to sixth aspect of the present invention, since a plurality of one-dimensional magnetic photonic crystals each having a magnetic thin film are laminated so as to sandwich a dielectric thin film having an optical length predetermined as $\lambda/4+m\lambda/2$ ($\lambda$ is the wavelength of light, and m is 0 or a positive integer) and also a plurality of magnetic thin films are present to increase the total thickness, the Faraday rotation angle is increased. At the same time, a large light transmittance can be obtained because of the presence of the dielectric thin film having a predetermined optical length with $(\lambda/4+m\lambda/2)$ thickness, which is sandwiched by a plurality (e.g., two) of one-dimensional magnetic photonic crystals laminated.

In addition, according to the second aspect of the present invention, since the optical lengths of two kinds of dielectric thin films are both set to $\lambda/4$, a large Faraday rotation angle can be obtained.

Also, according to the fifth aspect of the present invention, since the optical lengths of the respective magnetic thin films in two one-dimensional magnetic photonic crystals are set to respective integral multiples of $\lambda/2$ different from each other, light can be localized, and also the Faraday rotation angle can be enhanced while maintaining the light transmittance at a large value.

Moreover, according to the seventh aspect of the present invention, since in an optical isolator, the magneto-optical member which is constructed in a manner as described above and which has an excellent light transmittance and Faraday effect is employed as a 45 degree Faraday rotator, the characteristics such as the blocking of reflected light from a transmission line and the like can be improved.

While the present invention has been particularly shown and described with reference to the preferred embodiments, it will be understood that various changes and modifications will occur to those skilled in the art without departing from the scope and true spirit of the invention. The scope of the invention is therefore to be determined solely by the appended claims.

What is claimed is:

1. A magneto-optical member, characterized in that a plurality of one-dimensional magnetic photonic crystals, each of which comprises two dielectric multilayer films in each of which two kinds of dielectric thin films having different optical characteristics from each other are alternately laminated with each thickness thereof regular and a magnetic thin film which is provided between said two dielectric multilayer films, are laminated with two adjacent ones sandwiching a dielectric thin film having a predetermined optical length which is set to $\lambda/4+m\lambda/2$ where $\lambda$ is a wavelength of light and m is 0 or a positive integer.

2. A magneto-optical member according to claim 1, wherein an optical length of each of said two kinds of dielectric thin films is set to $\lambda/4$.

3. A magneto-optical member according to claim 1, wherein said two kinds of dielectric thin films have different refractive indexes from each other, and one dielectric thin film thereof having a smaller refractive index is in contact with said magnetic thin film.

4. A magneto-optical member according to claim 1, wherein an optical length of said magnetic thin film is set to an integral multiple of $\lambda/2$.

5. A magneto-optical member according to claim 1, wherein two of said one-dimensional magnetic photonic crystals are provided, and optical lengths of two of said magnetic thin films in said two one-dimensional magnetic photonic crystals are set to integral multiple of $\lambda/2$, respectively, and are different from each other.

6. A magneto-optical member according claim 1, wherein said two kinds of dielectric thin films have different refractive indexes from each other, and said dielectric thin film having a predetermined optical length is made of a material which is identical to that of said one dielectric thin film having a smaller refractive index out of said two kinds of dielectric thin films.

7. An optical isolator, characterized in that said magneto-optical member according to claim 1 is used as a 45 degree Faraday rotator.

* * * * *